Patented Nov. 11, 1930

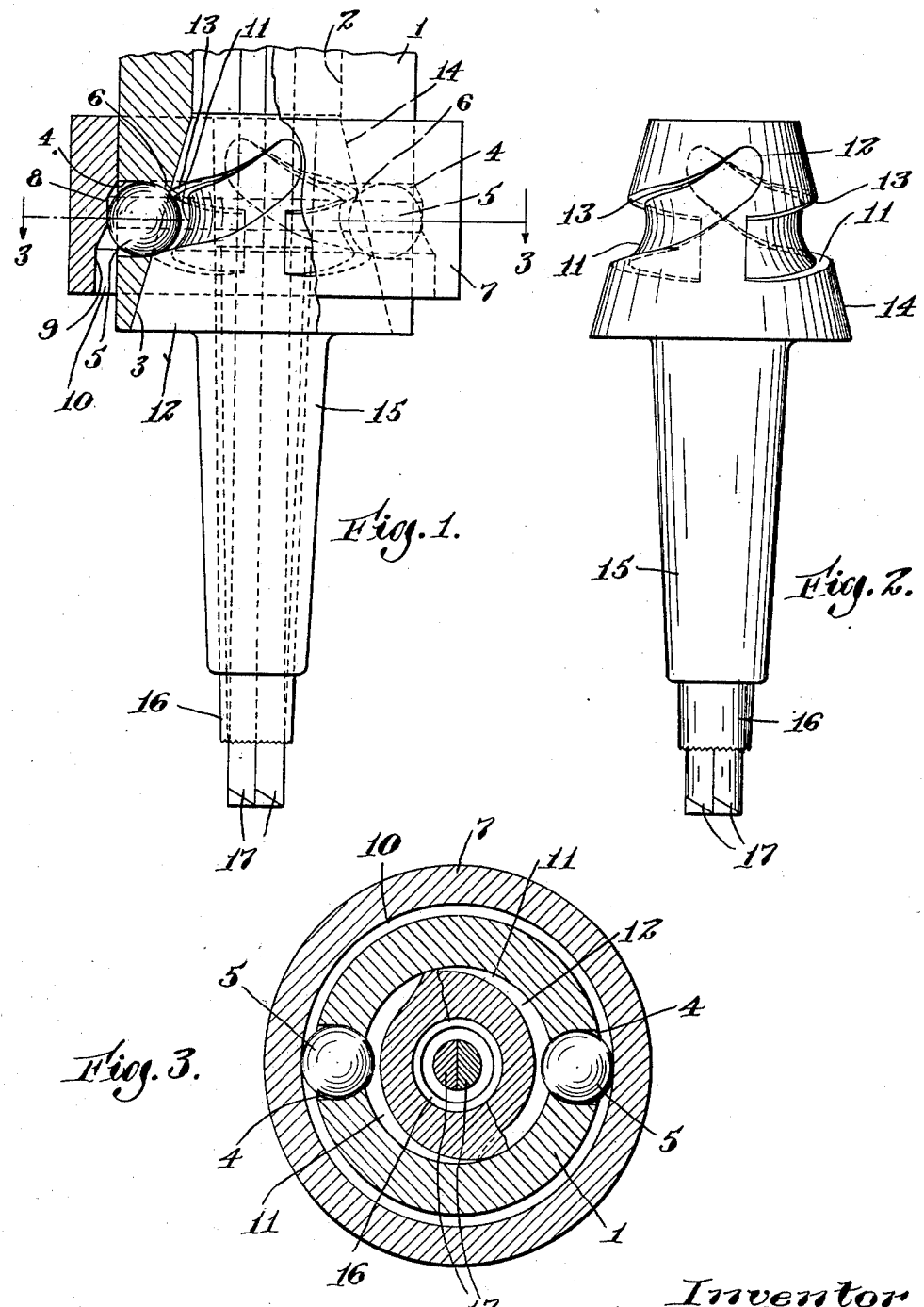

1,781,442

UNITED STATES PATENT OFFICE

ARTHUR L. CURRIER, OF NEW IPSWICH, NEW HAMPSHIRE

CHUCK

Application filed October 16, 1926. Serial No. 141,952.

My present invention is a novel and improved chuck, primarily intended for use as a saw holding chuck in button blank cutting machines, and is a continuation in part of my prior and copending application, Serial No. 140,371, filed October 8, 1926, now Patent Number 1,736,901 granted Nov. 26, 1929.

An important feature of the present invention is the provision of a chuck to hold a saw or other cutting or holding instrumentalities, which chuck will be manually controlled for disengagement or release of the chuck spun or spool from the spindle, and which will reengage itself in the rotating spindle upon insertion therein.

In the present invention I utilize novel holding, locking, and driving media, substantially as described in my prior and copending application on chucks, Serial No. 179,459 filed March 30, 1927, now Patent Number 1,686,601 granted Oct. 9, 1928.

In the present novel chuck, I utilize a manually operated locking ring, which ring may be raised by the operator during rotation of the spindle, whereupon the locking and driving means will be disengaged, automatically, by the weight of the chuck spun, and the spun will drop into the hand of the operator. Upon release of the locking ring by the operator the same will drop, by gravity, into normal position, forcing the locking and driving devices into locking position. Thereupon, when the chuck spun or spool is reinserted into the rotating spindle, spiral grooves on the spool will engage these locking means, preferably balls, and will ride thereon until the chuck spool is firmly seated in the rotating spindle.

I believe that my chuck, illustrated herein, is novel, and have therefore claimed the same broadly.

While I have illustrated my novel chuck herein as holding a saw, it will be appreciated that such a chuck may be utilized in combination with other forms of cutting instrumentalities, with equal facility and efficiency.

Referring to the drawings illustrating a preferred embodiment of my invention,

Fig. 1 is a sectional view, partly in elevation, of my novel chuck assembled in driving position;

Fig. 2 is an elevation of the chuck spun or spool illustrating the spiral grooves; and Fig. 3 is a cross sectional view on the line 3—3 of Fig. 1.

As shown in the drawings, my present novel chuck comprises a chuck spindle 1, hollowed on the interior as illustrated at 2 and having bevelled face 3 on the lower end of the spindle. Recesses 4 are provided in the spindle 1, and contain holding, locking and driving means, preferably balls 5. The inner edges 6 of the recesses 4 are arched over, as shown in Fig. 3, to prevent the balls 5 extending more than a predetermined distance into the interior of the spindle. An enclosing, lifting and locking ring 7 is provided, fitted around the spindle 1. This locking ring 7 is counter bored or recessed at 8, and again as illustrated at 9, to afford an annular recess 10 spaced sufficiently from the outer surface of the spindle 1 to permit the locking balls 5 to fall or roll therein and be released from the spiral grooves 11 in the spool or chuck spun 12 when the ring 7 is lifted. Thus, when the operator desires to remove the spool 12, the ring 7 is raised or elevated, during rotation of the spindle if desired, whereupon, the weight of the chuck spun will force the balls 5 into the space or recess 10 provided therefor in the locking ring, and the spool 12 will drop into the operator's hand. The chuck spool 12, as clearly indicated in Fig. 2, has a pair of spiral grooves 11, the upper edge of each of these spiral grooves being bevelled as indicated at 13. This bevelled edge 13 is the riding or supporting part of the spool on the balls 5, and due, partly to this bevelled edge 13 and the spiral formation of the grooves 11, when wear takes place either in the edge 13 or between the bevelled face 14 of the spool 12 and bevelled face 3 of the spindle 1, the chuck spool will ride farther up into the spindle, the grooves 11 riding over the balls 5 and maintaining a constant locked and driving engagement.

The chuck spool has a depending hollow shank 15, adapted to receive a saw or other cutting instrumentality 16, which is preferably of split spring metal, to obtain a tight friction fit within the hollow spindle 15. Being thus hollow, novel holding devices 17 may also pass through the spindle 1, shank 15 and saw 16, if desired. On replacing a chuck spool in the rotating spindle, the operator simply grasps the shank 15, inserts the spool 12 in the spindle recess, whereupon the spiral grooves 11 will engage the locking and driving balls 5 and ride thereon until the bevelled faces 3 and 14 are in close contact, whereupon the locking balls 5 will act as driving media between the rotating spindle 1 and spool 12.

An important feature and advantage of the present form of chuck is that the entire operation of removing the chuck spool and replacing the same may be performed without stopping the action or rotation of the spindle 1, thus greatly expediting removal and replacement of the chuck spool and increasing the efficiency of the machine.

It will be appreciated that while I have shown my novel chuck herein constructed and arranged for use in combination with a button blank cutting saw, I am not limited thereto, but my novel chuck may be utilized in any form of machine and with any form of cutting device wherein a quickly attachable, readily removable, and positively acting chuck of this type is desired. It will also be appreciated that I may vary the size, shape and arrangement of parts, within reasonably wide limits, without departing from the spirit of the invention.

My invention is further described and defined in the form of claims as follows:—

1. A chuck, comprising a rotatable spindle having a tapered opening therein, a tapered tool holding spool having spiral grooves of varying depth therein and adapted to enter said spindle, spool holding, locking and driving members in said spindle, the upper and lower walls of said grooves engaging said members when said spool is inserted in the tapered opening of said spindle and forcibly seating said spool in said spindle.

2. A chuck, comprising a rotatable spindle having a tapered opening therein, a tapered tool holding spool having spiral grooves therein and adapted to enter said spindle, said spiral grooves terminating adjacent the upper end of said tapered spool and increasing in depth from top end to bottom end of said grooves, and spool holding, locking and driving members in said spindle adapted to enter said grooves.

In testimony whereof, I have signed my name to this specification.

ARTHUR L. CURRIER.